United States Patent
Roell

(10) Patent No.: US 8,939,337 B2
(45) Date of Patent: Jan. 27, 2015

(54) METHOD AND APPARATUS FOR PRODUCING AN ELASTICALLY DEFORMABLE GLASS PLATE

(75) Inventor: Bernhard Roell, Donauwoerth (DE)

(73) Assignee: Grenzebach Maschinenbau GmbH, Asbach-Baeumenheim (DE)

( * ) Notice: Subject to any disclaimer, the term of this patent is extended or adjusted under 35 U.S.C. 154(b) by 335 days.

(21) Appl. No.: 13/322,057

(22) PCT Filed: May 27, 2010

(86) PCT No.: PCT/DE2010/000586
§ 371 (c)(1),
(2), (4) Date: Nov. 22, 2011

(87) PCT Pub. No.: WO2010/139297
PCT Pub. Date: Dec. 9, 2010

(65) Prior Publication Data
US 2012/0061440 A1    Mar. 15, 2012

(30) Foreign Application Priority Data
Jun. 2, 2009    (DE) .......................... 10 2009 023 602

(51) Int. Cl.
*B26F 3/06*    (2006.01)
*C03B 33/09*    (2006.01)
(Continued)

(52) U.S. Cl.
CPC ............... *C03B 33/091* (2013.01); *C03B 33/03* (2013.01); *C03B 33/033* (2013.01); *C03B 33/037* (2013.01)
USPC ........................... 225/93.5; 225/103; 225/105

(58) Field of Classification Search
USPC ......... 225/2, 17, 23, 93.5, 96.5, 96, 102, 103, 225/104, 105; 83/885, 16
See application file for complete search history.

(56) References Cited

U.S. PATENT DOCUMENTS 3,453,097 A * 7/1969 Hafner ........................... 65/112
3,489,090 A    1/1970 Martel
(Continued)

FOREIGN PATENT DOCUMENTS

DE    102005054669    5/2007
EP          397236 A1 * 11/1990 ............. B23K 26/00
(Continued)

OTHER PUBLICATIONS

International Search Report mailed Sep. 9, 2010 regarding International Application No. PCT/DE2010/000586.

*Primary Examiner* — Kenneth E. Peterson
*Assistant Examiner* — Jennifer Swinney
(74) *Attorney, Agent, or Firm* — Duane Morris LLP; J. Rodman Steele, Jr.; Gregory M. Lefkowitz

(57) ABSTRACT

The invention relates to an apparatus and to a method for the industrial production of elastically deformable large-surface-area glass plates in high quantities, comprising the following characteristics: a) a device for feeding a glass plate (3), b) a device for providing the surface of the glass plate (3) with initial damage in the region of the desired breaking line, c) a device for the locally limited heating of the glass surface by way of a laser beam moving on a straight line in a fan-shaped pivoting manner, d) a device for cooling the glass surface, wherein a controllable cooling nozzle delivering a fluid is disposed on at least one side of the laser beam, e) a device for transporting a thermally locally pretreated glass plate (3) into the region of a device for breaking the glass plate (3), f) a device for detecting a straight-line crack formation on the surface of a glass plate (3), g) a straight-lined breaking blade on the underside of the glass plate (3), which blade can be lifted on one side and/or both sides.

9 Claims, 6 Drawing Sheets

(51) Int. Cl.
*C03B 33/03* (2006.01)
*C03B 33/033* (2006.01)
*C03B 33/037* (2006.01)

(56) References Cited

U.S. PATENT DOCUMENTS

| | | | | |
|---|---|---|---|---|
| 3,526,162 | A * | 9/1970 | Willcox | 83/16 |
| 3,543,979 | A * | 12/1970 | Hamer et al. | 225/2 |
| 4,694,139 | A * | 9/1987 | Roder | 219/121.78 |
| 4,696,421 | A * | 9/1987 | Durr | 225/1 |
| 5,776,220 | A * | 7/1998 | Allaire et al. | 65/112 |
| 6,211,488 | B1 * | 4/2001 | Hoekstra et al. | 219/121.72 |
| 6,660,963 | B2 * | 12/2003 | Hoekstra et al. | 219/121.72 |
| 6,722,250 | B2 | 4/2004 | Wagner | |
| 7,182,007 | B2 * | 2/2007 | Berge et al. | 83/13 |
| 7,628,303 | B2 | 12/2009 | Hoetzel | |
| 7,812,281 | B2 * | 10/2010 | Acker et al. | 219/121.69 |
| 7,820,941 | B2 * | 10/2010 | Brown et al. | 219/121.69 |
| 2002/0006765 | A1 | 1/2002 | Michel et al. | |
| 2003/0019243 | A1 | 1/2003 | Biethmann et al. | |
| 2004/0211763 | A1 * | 10/2004 | Lambert | 219/121.84 |
| 2004/0251290 | A1 * | 12/2004 | Kondratenko | 225/2 |
| 2006/0191970 | A1 | 8/2006 | Kataoka et al. | |
| 2006/0209224 | A1 * | 9/2006 | Nakanishi | 349/56 |
| 2006/0266783 | A1 | 11/2006 | Hoetzel | |
| 2007/0151962 | A1 * | 7/2007 | Doll et al. | 219/121.72 |
| 2007/0158381 | A1 * | 7/2007 | Lisec | 225/2 |
| 2010/0089886 | A1 * | 4/2010 | Sercel et al. | 219/121.72 |

FOREIGN PATENT DOCUMENTS

| | | | |
|---|---|---|---|
| JP | 05032428 A * | 2/1993 | C03B 33/09 |
| JP | 7181138 | 7/1995 | |
| JP | 2000219528 | 8/2000 | |
| KR | 20010015197 | 2/2001 | |

* cited by examiner

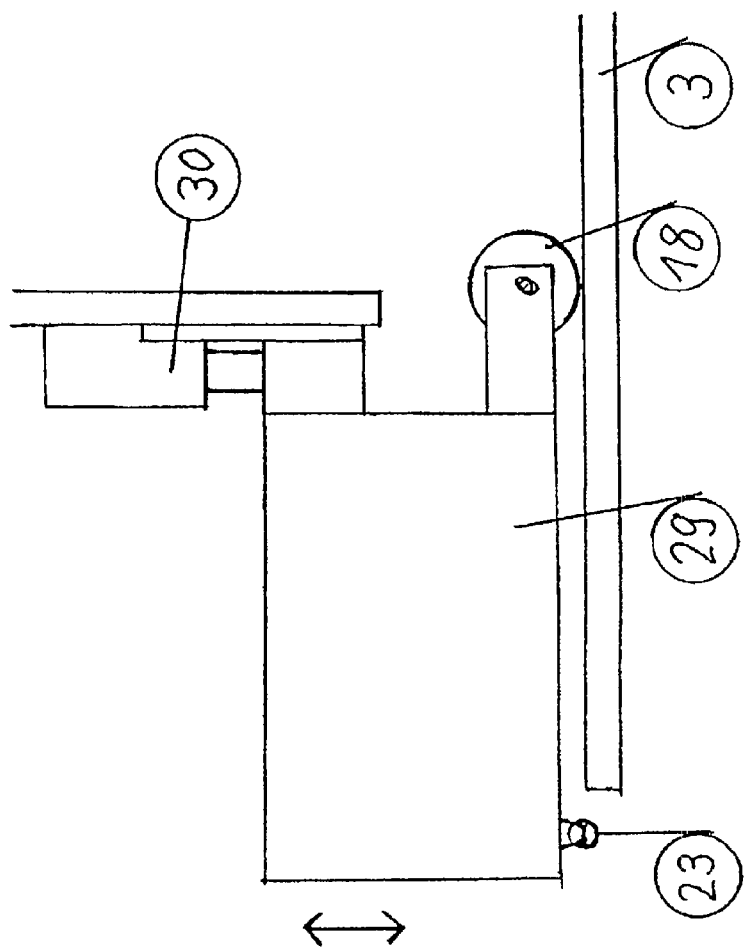

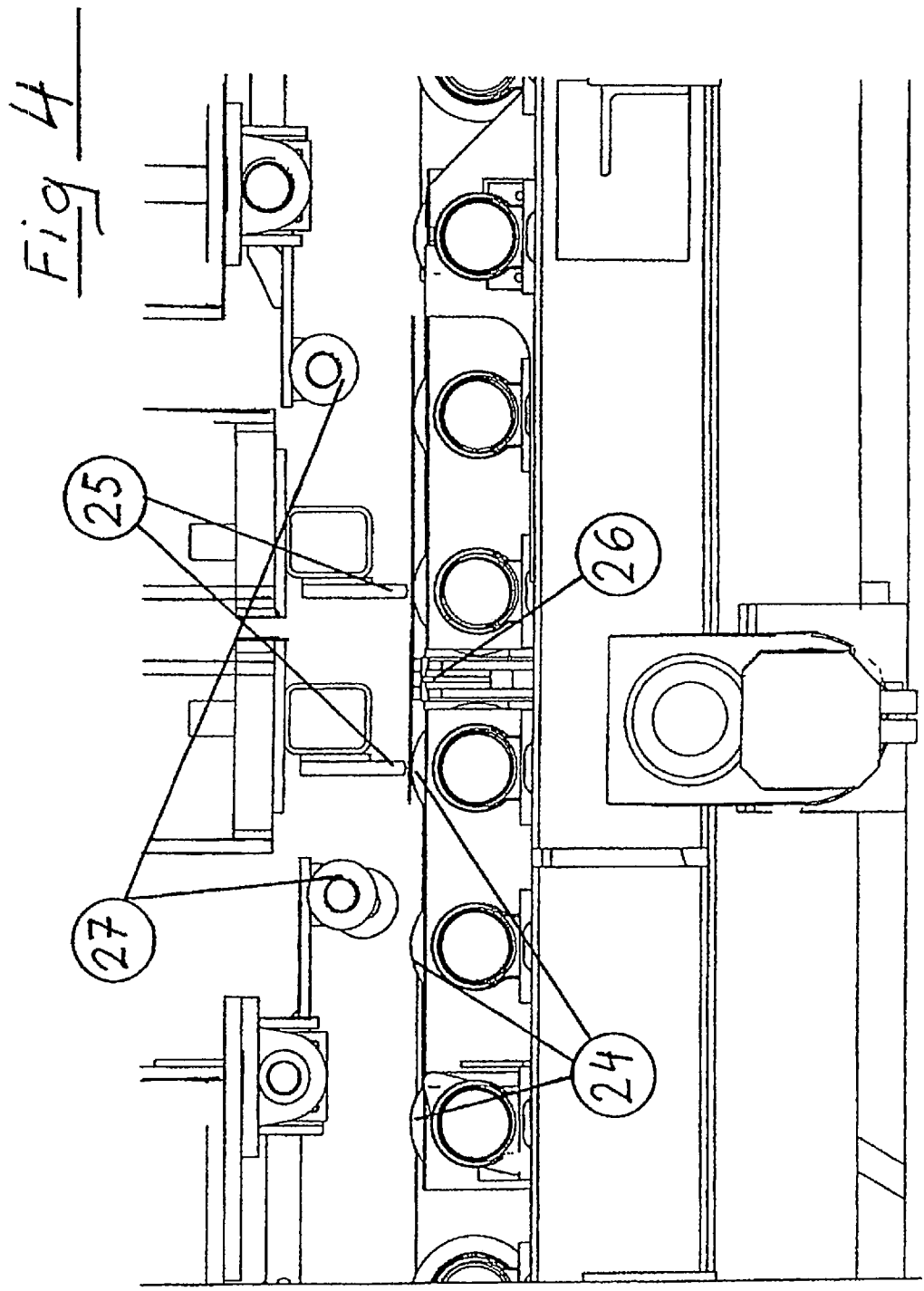

METHOD AND APPARATUS FOR PRODUCING AN ELASTICALLY DEFORMABLE GLASS PLATE

CROSS-REFERENCE TO RELATED APPLICATIONS

This application is a §371 national stage entry of International Application No. PCT/DE2010/000586, filed May 27, 2010, which claims priority to German Patent Application No. 10 2009 023 602.3, filed Jun. 2, 2009, the entire contents of which are incorporated herein by reference.

FIELD OF THE INVENTION

The invention relates to a method and an apparatus for producing elastically deformable glass plates. Such glass plates are generally obtained in the desired formats from larger glass plates.

BACKGROUND OF THE INVENTION

For this purpose, appropriate cuts or score marks are usually produced in a large glass plate with a cutting wheel or a needle and the glass is then mechanically broken at these desired breaking lines. The breaking operation can then be realized by hand or by means of a mechanical apparatus. The mechanical breaking operation is here difficult to control, since the breaking occurs abruptly. With such methods, it can therefore sometimes happen that the break takes a different course from that which is desired and the glass breaks at a different breaking line.

From the patent literature of DE 10 2005 054 669 A1, the solution to the problem is therefore based on developing a method in which the glass to be cut breaks only at the desired line.

This object is achieved by virtue of the fact that a method for breaking glass and ceramic, which method is characterized in that glass is broken at a marked site by means of ultrasound, is claimed.

According to this printed document, it can further be provided that said method is characterized in that the glass, for the purpose of the desired separation, has first been cut at a specific line with a cutting wheel, scored with a needle or cut with a laser.

An apparatus for implementing such a method cannot be derived from this printed document. Nor is there here any proposal for the design of a plant for machining precuts of glass plates on an industrial scale.

In addition, a method for the laser thermal separation of flat glass plates is known from DE 10 2004 014 277 A1. The object of this invention is to make thermal markings in glass plates along predefined desired breaking lines and, at the same time, to be able to pursue higher cutting speeds (significantly greater than 1 m/min). In particular, good-quality glasses of relatively large thickness should also be able to be separated and even very thick glasses (about 20 mm) should be scored sufficiently deeply. All this should also be achieved in respect of curved cuts.

For the achievement of this object, in this printed document a method for separating flat glass plates by thermal scoring by means of a laser beam is claimed, which laser beam, in the form of a beam spot, is moved along a desired separation line at a chosen rate of advance over the glass surface. Furthermore, that line region on the glass surface which has thus been laser-heated is here cooled by a tracking cooling nozzle, wherein beforehand, in the or shortly before the starting region of the desired separation line, an initial invasion of the glass surface in the form of a mechanically or otherwise produced scoring point is made and wherein, after the thermal scoring, the glass proceeds to be broken. This described method is characterized in that the guidance of the laser beam along the desired separation line is realized in the form of a repetitive frequent sweep along the desired separation line by means of a rapidly scanned laser beam.

In such a laser thermal separating method, on all sides of a glass plate microcracks are avoided on the edges. Such a glass plate is therefore elastically deformable to a greater degree than a glass plate which has been cut to size in a normal way.

Apart from a basic sketch (shown in FIG. 4 of said document) of an apparatus for cutting flat glass plates, no allusions to a constructional design of the described method can be derived from DE 10 2004 014 277 A1. In particular, this printed document clearly focuses on the scientific investigation of such a method. The industrial use of such a method constitutes a quite different object, however.

U.S. Pat. No. 489,908 A discloses a method and an apparatus for automatically separating a moving glass ribbon along a traced line, consisting of a light source directed at the glass ribbon and a photocell which scans the glass ribbon. The separation of large-format glass plates by means of laser beams is not possible herewith.

In addition, U.S. Pat. No. 6,722,250 B2 discloses a method for continually cutting to length pre-cuts from a continuously moved endless material, in which the optical detection of the scribed line by means of red-light lighting and the registration by means of a camera is indicated. With this method, however, elastically deformable large-format glass plates cannot be separated on an industrial scale and in a failsafe manner.

Moreover, such methods have hitherto been used only to cut small glass areas, such as glass plates for protecting mobile phone displays.

SUMMARY OF THE INVENTION

The object of the apparatus according to the invention and of the corresponding method is therefore to define an apparatus for separating elastically deformable large-format glass plates by means of laser beams, which is relatively cheap, is usable on an industrial scale and is fail-proof.

This object is achieved with an apparatus as claimed in claim 1 and according to a method as claimed in claim 11.

BRIEF DESCRIPTION OF THE DRAWINGS

The apparatus according to the invention is described in greater detail below. More specifically, FIG. 3a: shows a detail from FIG. 3, FIG. 4: shows a detailed representation from the region of the breaking blade.

DETAILED DESCRIPTION OF THE INVENTION

Figure 1:
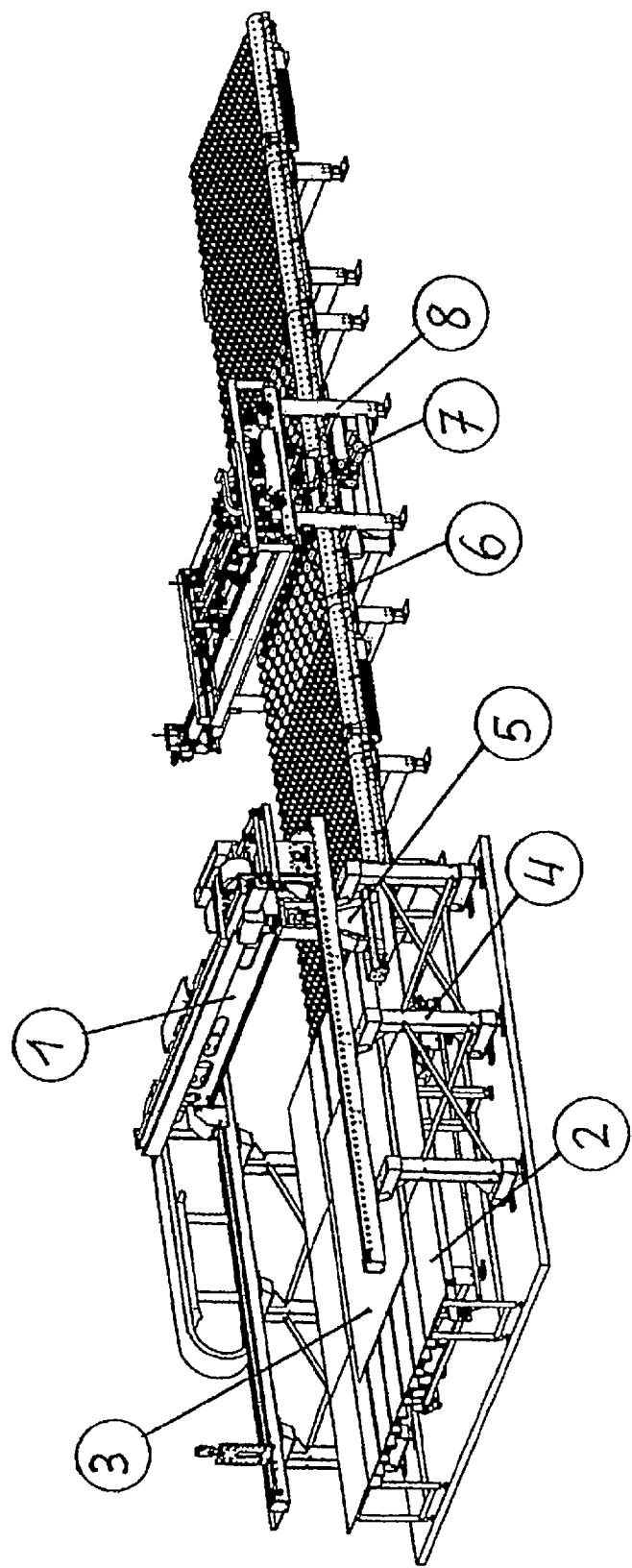
FIG. 1: shows a perspective representation of the overall plant according to the invention.

FIG. 1 shows a perspective representation of the overall plant. The apparatus which is represented here is a part of an industrial plant which allows the scribing and separation of large glass plates 3 at high speed, with great accuracy and with high fail-safeness.

For the scribing or production of a clearly structured scribed joint, in this apparatus a process for heating and cooling the surface of the glass plate 3 to be separated is used on a predetermined scribed line. The heating is here served by a laser beam, which, pivoted in a fan shape, heats progressively on a specific line the surface of a glass plate 3, wherein the laser beam is followed at a set distance by a nozzle for the application of coolant. The laser beam can also be pivoted progressively and repetitively, according to choice.

In FIG. 1, the glass plate 3 to be machined is transported from the direction of the left-hand side by means of a roller conveyor 6 (not represented at this place), or a corresponding other conveying means, onto the machining table 2.

Spanning the machining table 2, a gantry 1 extends for the reception of the laser working head 5 and of the cooling device. This gantry 1 is mounted on a free-standing base frame 4 for the reception of the cutting unit. In FIG. 1, a unit for controlling the place of use of a laser beam, the laser working head 5, is also placed on the right-hand side of the gantry 1. In the rear part of FIG. 1 in the running direction of the roller conveyor 6, the base frame 8 for the breaking device of a scored glass plate 3 is represented. Here a part of the synchronous drive 7 for the breaking blade 26 of the breaking device can also be recognized.

Figure 2:
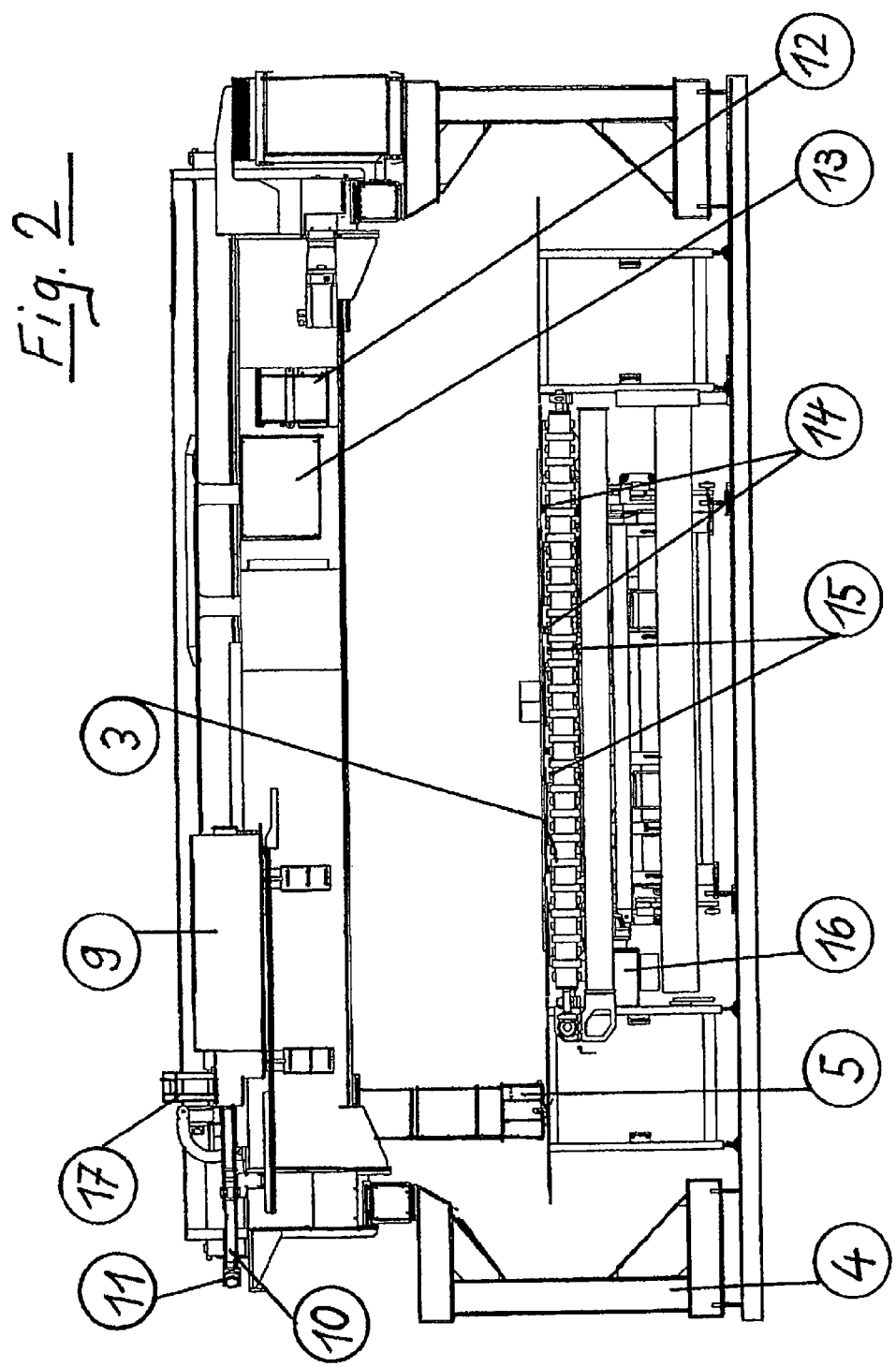
FIG. 2: shows a cross section of the gantry.

FIG. 2 shows a cross section of the gantry 1.

In this figure, the gantry 1 for receiving the laser unit is shown from the rear. This is apparent, inter alia, from the fact that the laser working head 5, in contrast to the representation in FIG. 1, is shown on the left-hand side of the gantry 1 in the marginal position. The base frame 4 of the laser unit is in this view apparent on both sides. The glass plate 3 can be seen in cross section. The laser beam source 9 itself is represented on the left-hand side of the transverse web of the gantry 1. Since the laser beam required to heat the glass plate must be transported along a specific scribed line, it must not only be repeatedly diverted, but also have a mobile laser working head 5. This happens on the straight path sections of invariable length in special pipes, with the use of deflection mirrors. The path section whose length changes during the process of shifting the laser beam over a glass plate 3 is formed from a collapsible bellows. This path section constitutes the connection between the last pipe connection and the so-called polygon wheel. Such a polygon wheel consists of a polygonal basic structure, which is rotatable about a central axis and which by means of a specific rotational velocity, with the aid of various mirrors, allows a laser beam to be fanned out. Instead of a polygon wheel, at least one simple rotatable mirror is suitable for this purpose.

According to the representation in FIG. 2, the laser beam generated by the laser beam source 9 is guided via a tubular laser beam guide 10 and a following deflection device 11 into the laser head 5. The intermediate piece between the deflection device 11 and the laser head 5, in the guise of a folding bellows, as well as a further deflection mirror, are not represented in FIG. 2. The entire path section over which the laser beam is guided consists of a space in which a slight overpressure reigns in relation to the environment. A value of about 0.1 bar to 0.3 bar overpressure has here proved advantageous. As the atmosphere, nitrogen or normal air can be used.

On the right-hand side of the transverse beam of the gantry 1, a supply reservoir 12 for the coolant used in the process can be recognized. In this region is also found a device 13 for treating the coolant. As the coolant, a cationic surfactant has proved successful. A mixture of water and ethanol can also however be used. For the successful application of the coolant, the air pressure with which the coolant is applied is crucial. Here, a value between 5 to 10 bar has advantageously been determined. The coolant which has been applied in this way ends up creeping into the crack induced by the laser and thus subsequently supports the work of breaking off a glass plate 3. Through the use of a Laval nozzle, the air stream can be accelerated. Through the arrangement of a plurality of cooling nozzles 19 arranged in a row, the induced crack in the glass plate 3 can be driven deep. In the region of the machining table 2, a glass plate 3 is moved onward by means of a plurality of conveyor belts 15 and brought into the desired position. Since the action of a laser beam on a glass plate 3 can cause the latter to heat up strongly even on the underside, or radiates through the latter, protective flaps 14 are provided for the protection of the conveyor belts 15, which protective flaps, prior to the raising of the machining table 2, slide under the glass plate 3 and thus protect the conveyor belts 15. An excessive heating of the glass plate 3 can occur, for example, through the failure of a cooling nozzle 19. Moreover, the conveyor belts 15 can also be damaged by the direct irradiation of a laser beam. The protective flaps 14 are preferably made of aluminum. The drive and the associated control device are not represented for reasons of clarity.

Since the metal layer formed by the protective flaps 14 can, on the other hand, overcool the glass plate 3 resting thereon and can thus impair the scribing process, it can be provided to separate the protective flaps 14 from the glass plate 3, via an air layer, by regularly arranged distancing means. A comparable effect can also be achieved by measures for distancing the glass plate 3 by means of ultrasound.

The coverage of the glass plate 3 by the underlying protective flaps makes the fitting of sensors for accurate positioning more difficult. Appropriate sensors configured as line lasers, or ultrasound sensors, here provide a remedy. These are known to the person skilled in the art in terms of their assortment and their respective field of application.

The driving of conveyor belts 15 is realized by means of the drive 16 shown in FIG. 2. The drive 17 of the displacement device of the laser working head 5 can be recognized on the left-hand side of the transverse strut of the gantry 1 in FIG. 2.

In a further development stage, the use of a more powerful laser is provided. For weight reasons, this is not fastened to the gantry 1, but stationary in the region of the machining table 2. The laser then radiates from there in the direction of the gantry 1. In this case, the deflection mirrors require cooling.

Figure 3:
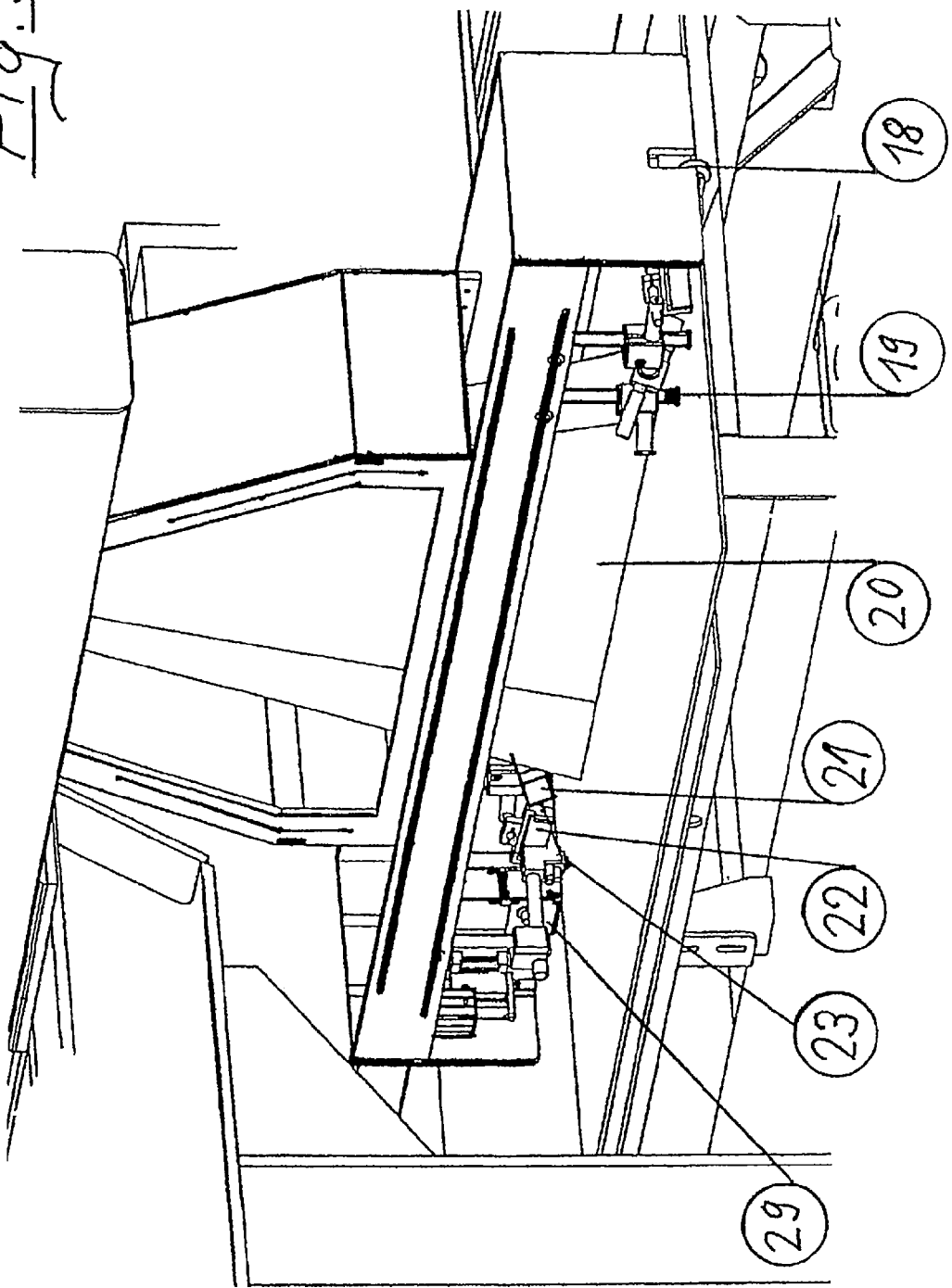
FIG. 3: shows a detailed representation from the region of the scribed line.

FIG. 3 shows a detailed representation from the region of the scribed line, in particular in the region of the laser head 5. The focus is here on the substantially triangular area of the laser fan 20. Adjacent to the laser fan 20, on its right-hand side, a cooling nozzle 19 can be recognized. Opposite, on the other side of the shown laser fan, a notching device 29 is represented. In this notching device 29, a small scoring wheel 23 is indicated. Adjacent to this are a light source 22 and an associated camera 21 for detecting the laser scribe. In this representation, the associated positioning wheel 18 is concealed.

The same arrangement is disposed on the opposite side. Here, although the positioning wheel of the associated notching device 29 can be recognized, the rest of the notching device 29 is concealed.

Once the notching device 29 has shifted to the site at which the separation of the glass plate 3 is due to take place, the positioning wheel 18 is guided on the glass plate 3, in the direction of the subsequent scribe, until such time as the scoring wheel 23 of the notching device 29 butts against the margin of the glass plate. The scoring wheel 23 thereby not only carves a notch at the intended location into the upper margin of the glass plate 3, but is also itself raised. This raising of the scoring wheel 23 is detected by a light barrier (not represented) and subsequently the entire notching device 29 is raised.

In the complementary FIG. 3a, this is effected by means of the lifting apparatus 30. Here the glass plate 3, the positioning wheel 18, the scoring wheel 23 and the notching device 29 are drawn separately in combination. The entire apparatus for cutting glass plates 3 to size can be rotated through 90 degrees. Glass plates 3 can therefore also be cut to size in the transverse direction.

FIG. 4 shows a detailed representation from the region of the breaking blade 26. In this figure, the conveyor rollers 24 can be recognized as a horizontal general arrangement, above which the pushers of the press-down device 25 for residual strips are disposed. These pushers are movable by motorized means and break off head strips and residual strips of glass plates 3. The hold-down devices 27 hold down short plate pieces in which gravitational force, or their own weight, is insufficient for the break-off. The hold-down devices can also come from below or be configured as a subassembly which acts from below by means of suction devices. A further option for the function performed by the hold-down devices 27 is the action of ultrasound from above.

Figure 5:
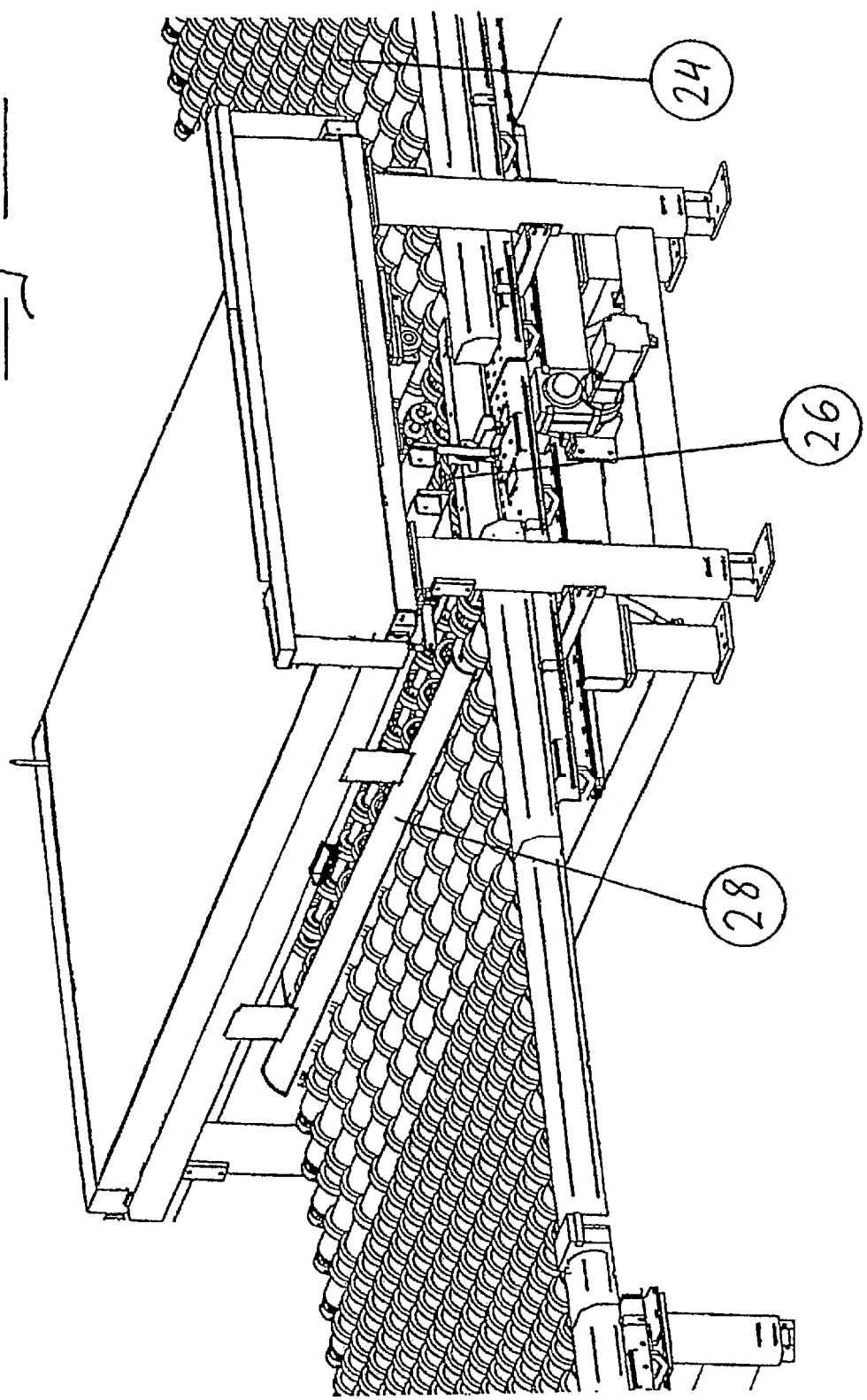
FIG. 5: shows a perspective view of the breaking device.

FIG. 5 shows a perspective view of the breaking device. For the breaking operation, knowledge of the precise position of the scribed line, which must run from one end to the other end of a glass plate 3, is very important. This is because the breaking operation can only proceed satisfactorily if the scribed line is positioned exactly above the longitudinal axis of the breaking blade 26. For exact control of the speed of a glass plate 3 to be broken, the knowledge of the distance from the front edge to the scribed line is therefore the precondition for an exact positioning. The position of the front edge of a glass plate 3 can be registered with sufficient accuracy by means of standard sensors. The position of the scribed line, which is produced by the laser in conjunction with the action of the cooling nozzle, is not easily ascertainable, however. In principle, light barriers or laser barriers can be used to register the front edge of a glass plate 3, wherein the distance up to the cuts is then calculated. Here, it is necessary to allow for many tolerances, the accumulation of which is difficult to assess. According to the invention, it is therefore optionally proposed to subject the corresponding region of a glass plate 3 to a liquid condensate, especially water vapor. The scribed line can hereby be registered with a camera, or via infrared sensors in conjunction with a camera, and/or an additional lighting, and can be evaluated by the use of control technology.

The breaking-off of a glass plate 3 is realized by the raising of the breaking blade 26. For this purpose, the linearly configured breaking blade 26 is actuated by means of a synchronous drive 7. With this drive it is also possible, in addition to raising over the entire length, by means of a selective one-sided raising of the breaking blade 26, to put the glass plate 3 firstly under tension at isolated points and thus induce the separation by a continuous crack formation specifically on one side.

The selective one-sided raising is not, however, absolutely necessary.

A comparable effect is also possible with an extensible ram in the breaking blade 26.

A further option consists in providing in the region of the breaking blade 26 a unit which enables ultrasound waves to be irradiated into the scribed line.

The complex control of the described motional sequences calls for a special control program.

REFERENCE SYMBOL LIST (1) gantry for receiving the laser working head
(2) machining table
(3) glass plate
(4) base frame of the cutting unit
(5) laser working head
(6) roller conveyor
(7) synchronous drive for a breaking blade
(8) base frame of the breaking device
(9) laser beam source
(10) laser beam guide
(11) deflection device for the laser beam
(12) supply reservoir for the coolant
(13) treatment of the coolant
(14) protective flaps for the conveyor belts
(15) conveyor belts
(16) drive of the conveyor belts
(17) drive of the displacement device of the laser working head
(18) positioning wheel of the notching device
(19) cooling nozzle
(20) laser fan
(21) camera for detection of the laser scribe
(22) light source
(23) scoring wheel of the notching device
(24) conveyor rollers
(25) press-down device for residual strips
(26) breaking blade
(27) hold-down device
(28) detection device for a laser scribe
(29) notching device
(30) lifting device for the notching device 29

The invention claimed is:

1. An apparatus for the industrial production of elastically deformable large-area glass plates in high quantities, comprising:
   a) a device for feeding a glass plate (3),
   b) a device for making an initial score on the top side of the glass plate (3) in the region of the desired breaking line,
   c) a device for the locally limited heating of the glass surface with a laser beam,
   d) a device for cooling the glass surface, wherein on at least one side of the laser beam there is disposed at least one cooling nozzle (19), which can be operated intermittently and controlled in terms of its intensity and which conveys a fluid that is variable in temperature and feed rate, and wherein the coolant is applied with an air pressure of 5 to 10 bar,
   e) a device for transporting the thermally locally pretreated glass plate into the region of a device for breaking the glass plate,
   f) a device for detecting a rectilinear crack formation on the surface of a glass plate (3),
   g) a rectilinear breaking blade on the underside of the glass plate, wherein the rectilinear breaking blade can be raised, wherein shorter plate pieces in which a weight of the shorter plate pieces is insufficient for the break-off are held down by at least one motorized hold-down device (27).

2. The apparatus as claimed in claim 1, characterized in that, in a space in which the laser beam is guided, nitrogen or normal air are used as the atmosphere.

3. The apparatus as claimed in claim 1, characterized in that the coolant is a cationic surfactant or consists of a mixture of water and ethanol.

4. The apparatus as claimed in claim 1, characterized by the arrangement of a plurality of cooling nozzles (19) arranged in a row, for inducing a deep crack in the glass plate (3).

5. The apparatus as claimed in claim 1, characterized in that, in the region of the machining table (2), a glass plate (3)

is moved onward by means of a plurality of conveyor belts (15), wherein protective flaps (14) are provided for the protection of the conveyor belts (15), which protective flaps, prior to the raising of the machining table (2), slide under the glass plate (3), the protective flaps (14) being separated from the glass plate (3), via an air layer, by regularly arranged distancing means.

6. The apparatus as claimed in claim 1, characterized in that the devices for heating, for cooling and for making an initial score are rotatable through 90 degrees.

7. The apparatus as claimed in claim 1, characterized in that the cooling nozzle (19) consists of a Laval nozzle.

8. The apparatus as claimed in claim 1, wherein a pressure of a space in which the laser beam is guided is above an atmospheric pressure of the surrounding environment.

9. The apparatus as claimed in claim 1, wherein the laser beam is emitted in a fan-shaped pattern.

* * * * *